UNITED STATES PATENT OFFICE.

T. CHALKLEY TAYLOR, OF PHILADELPHIA, PENNSYLVANIA.

IMPROVED MODE OF PUTTING UP CAUSTIC SODA FOR THE MANUFACTURE OF SOAP.

Specification forming part of Letters Patent No. 89,704, dated May 4, 1869.

*To all whom it may concern:*

Be it known that I, T. CHALKLEY TAYLOR, of the city and county of Philadelphia, in the State of Pennsylvania, have invented a new and useful Improvement in Protecting Caustic Alkali from the Action of Atmospheric Moisture; and I do hereby declare that the following is a full, clear, and exact description of the same.

Previous to my invention deliquescent salts and acids have been treated in a powdered state with fusible substances which are insoluble in water, so as to form a coating upon each article of the salt or acid, as the case may be, and thus envelop and protect it from injury when exposed to air and moisture. In this case there is simply a mechanical mixture of salt or acid with a protecting substance, which mixture possesses peculiar advantages when used for certain definite purposes.

I am also aware that caustic alkali has been protected in large masses from deliquescence by enveloping blocks of this substance with paper or linen saturated with water-proof substances.

I also refer to Letters Patent numbered 52,910, which were granted to me on the 27th day of February, A. D. 1866, wherein I describe and claim a method of putting up caustic alkali in vessels, so as to protect it from absorbing moisture from the air, by coating the block or pieces with fatty matter.

In order to safely preserve caustic alkali, so that it can be conveniently handled and put in the market, to be sold in different quantities, I have put up this substance in vessels, in small blocks, of a given size or weight, such as was found most convenient in selling and using it with the least water.

Each block was completely covered externally with a proper thickness of fatty matter, and in this way the blocks could be readily retailed without risk, loss, or injury.

My present improved method is to thoroughly incorporate with caustic alkali a substance which will protect its atoms or particles from deliquescence, which will not impair the properties of this alkali in its use as a detergent in the manufacture of soap, and which will also unite chemically with the alkali and form a powerful basic soap, perfectly soluble in water, by which means every particle or atom of the alkali is protected from atmospheric moisture, and air-tight vessels, in which it has been found necessary heretofore to preserve caustic alkali, may be dispensed with, as will be shown in the following description.

I first reduce caustic alkali by grinding or crushing or melting to a proper degree of fineness—say, to the fineness of grains of wheat, or even finer, if desired—and then thoroughly mix with this substance oil, grease, or other fatty matter, thereby forming a basic soap which is soluble in water, but which will not readily absorb moisture from the atmosphere when exposed thereto. This substance I then pack into barrels or other vessels, from which it can be cut out, and retailed or used in greater or less quantities, as may be required.

Under all the old methods of protecting caustic alkali, some of which I have above described, a block or piece cannot be cut without exposing the surfaces of the alkali to the action of the air; but by the treatment above described this is not the case, for the reason that the fatty or protective matter is thoroughly incorporated with the granules or particles of alkali throughout the entire mass. Hence the new mixture can be readily cut up into pieces of various sizes, as may be required in retailing or using it, without loss or injury.

The proportions which I prefer to adopt, but which I do not confine myself to, are four parts of the protective matter to sixteen parts of the ground alkali.

While I prefer to employ oil, tallow, or other fatty matter as the protective substance for the alkali, I do not confine myself to fats alone, as rosin, silicate of soda, and other substance may be used, which will protect the alkali from the action of atmospheric moisture, and at the same time when mixed with the alkali will be soluble in water, and form one of the ingredients in the manufacture of soap.

If desirable, the fatty matter may be saponified or made into a soap before mixing it with caustic alkali, by which means I avoid subtracting any part of the strength of the alkali, as is the case when I use the materials as above described.

As a new and improved article of manufacture, I claim as new and desire to secure by Letters Patent—

A highly-concentrated or basic soap, composed of a mixture of granulated soda or other caustic alkali and a fatty matter or its equivalent, substantially as described.

T. CHALKLEY TAYLOR.

Witnesses:
JOHN WHITE,
GEO. W. LEHMAN.